(12) United States Patent
Rizzi et al.

(10) Patent No.: US 8,673,230 B2
(45) Date of Patent: Mar. 18, 2014

(54) SUPPORT SYSTEM OF HEAT EXCHANGER PLATES IN ISOTHERMAL CHEMICAL REACTORS

(75) Inventors: Enrico Rizzi, Casnate con Bernate (IT); Ermanno Filippi, Castagnola (CH); Mirco Tarozzo, Ligornetto (CH)

(73) Assignee: Methanol Casale SA (CH)

( * ) Notice: Subject to any disclaimer, the term of this patent is extended or adjusted under 35 U.S.C. 154(b) by 947 days.

(21) Appl. No.: 12/747,638

(22) PCT Filed: Nov. 20, 2008

(86) PCT No.: PCT/EP2008/009793
§ 371 (c)(1),
(2), (4) Date: Jun. 11, 2010

(87) PCT Pub. No.: WO2009/074212

PCT Pub. Date: Jun. 18, 2009

(65) Prior Publication Data
US 2010/0284869 A1    Nov. 11, 2010

(30) Foreign Application Priority Data
Dec. 11, 2007   (EP) .................................... 07023925

(51) Int. Cl.
B01J 19/00   (2006.01)
B01J 8/00    (2006.01)

(52) U.S. Cl.
USPC ........... 422/198; 422/200; 422/646; 165/157; 165/170; 29/428

(58) Field of Classification Search
USPC .................. 422/198, 200, 646; 165/157, 170
See application file for complete search history.

(56) References Cited

U.S. PATENT DOCUMENTS

| | | |
|---|---|---|
| 2002/0088613 A1 | 7/2002 | Filippi et al. |
| 2004/0018124 A1 | 1/2004 | Filippi et al. |
| 2005/0061490 A1 | 3/2005 | Filippi et al. |

FOREIGN PATENT DOCUMENTS

| | | |
|---|---|---|
| DE | 10031347 | 1/2001 |
| EP | 1284813 | 2/2003 |
| EP | 1757360 | 2/2007 |

*Primary Examiner* — Lessanework Seifu
(74) *Attorney, Agent, or Firm* — Akerman Senterfitt (57) ABSTRACT

System for supporting a plate heat exchanger (10, 100, 200) inside an isothermal chemical reactor (1), comprising a circumferential ring structure (40) fixed at least to top radial sides (19s) of the plates (11), said structure being formed as a single or double ring.

10 Claims, 8 Drawing Sheets

SUPPORT SYSTEM OF HEAT EXCHANGER PLATES IN ISOTHERMAL CHEMICAL REACTORS

FIELD OF APPLICATION

The invention relates to technique of isothermal or pseudo-isothermal chemical reactors. More specifically, the invention relates to a heat exchanger plates structural connection system inside an isothermal chemical reactor.

BACKGROUND ART

As known, isothermal or pseudo-isothermal chemical reactors are provided with an internal heat exchanger, adapted to provide to or remove heat from the chemical reaction which is generated in the reactor itself. The heat exchanger, usually, is inserted into a catalytic layer inside the reaction zone, and serves to keep the temperature of the reactants within an ideal range compensating the production (or absorption) of heat of the reaction itself. Among other uses, isothermal reactors are widely common in the plants for the production of methanol, whose synthesis reaction is exothermal.

The abovementioned reactors are of various types, for example axial, radial or combined flow, depending on the path through which the reactants pass with respect to the main axis of the reactor.

The radial or axial/radial flow isothermal reactors, in particular, are generally arranged as a pressure vessel, wherein a catalytic cartridge is accommodated, delimitated by two perforated coaxial walls and containing a suitable catalyser (catalytic bed).

In the above chemical reactors, it is also known to provide a plate heat exchanger, in which the heat exchange elements are represented by box-shaped, flattened parallelepiped elements, known as "plates". The plates are essentially made up of two rectangular walls, connected to each other at least along the perimeter, to define an internal chamber for the passage of a heating or cooling fluid. A chemical reactor provided with a plate heat exchanger, or more simply a plate reactor, is known for example from EP-A-1284813.

Plate reactors are widely appreciated because of easy construction, easy installation even in pre-existing reactors, large heat exchange surface compared to the dimensions, which in many applications makes them preferable to reactors with tube exchangers. It is also known to perform a revamping by arranging a new plate exchanger inside a pre-existing reactor, replacing a tube exchanger.

The technique of plate reactors is confronted with the problem of adequately support the heat exchange plates, that is the abovementioned box-shaped bodies, inside the reactor.

A plate support system must meet various requirements, among which; supporting the weight of the plates in an adequate manner; guarantee reliability over time, for example concerning the vibrations caused by the reactant/product flow and which could jeopardise the physical soundness of the exchanger; provide the possibility to remove single plates or groups of plates for maintenance or replacement.

In addition, the plate support system is subjected to constructional and executive restraints due to the accommodation within a chemical reactor, where the available space is limited and accessibility might be complicated. Bulky supports can be unacceptable for example because they lower the volume available to the reaction and/or they decrease the loading/unloading capacity of the catalyst. Even more importantly, when intervening on an existing reactor and already used over a long period of time, welding operations to provide new supports are not recommendable, and one should try to use the existing ones.

Generally, there is provided a circumferential support made up of a bracket welded onto the internal edge of the cylindrical shell of the reactor, at the inlet wall of the catalytic bed, while no support is provided further inside, especially in old reactors. In other cases, the plate exchanger lies on transversal support beams, for example C-shaped or double C-shaped beams, welded inside the reactor. It should be observed that in vertical axis reactors, these supports are disposed near the lower end plate, thus not easily accessible.

Usually, the heat exchanger comprises a given number of modular elements of plate packs, each forming a section of the annular body of the exchanger. Modular construction is advantageous especially for mounting into a reactor with a partial opening, which does not allow insertion of the complete exchanger. In such cases, mounting of the exchanger inside the reactor (or replacement of the existing exchanger) is carried out by inserting the plate packs one by one, and there arises the problem of restoring the mechanical unity of the exchanger to ensure safe support and prevent the plates from shifting from the mounting position, especially when only the abovementioned external circumferential support (bracket) is available.

The known support systems need improvement to meet the requirements mentioned beforehand. In particular, known systems do not meet the requirement of total restoration of the monolithic structure of the modular exchangers, upon completion of mounting operations inside the reactor.

SUMMARY OF THE INVENTION

The problem on which the present invention is based is that of designing and providing a mechanical support system of the plates, in isothermal reactors of the type defined above, capable of meeting the abovementioned requirements.

The problem is solved by means of a mechanical support system of a plate heat exchanger inside an isothermal chemical reactor, said exchanger having a generally cylindrical-annular structure and radial heat exchange plates, said plates having a box-shaped body substantially parallelepiped with sides parallel to the axis of the reactor and sides radial with respect to the same axis of the reactor, at opposite ends of the plates themselves, said system being characterised in that it comprises a circumferential hoop structure fixed to the radial sides of at least one end of said plates.

According to aspects of the invention, said circumferential hoop structure is in the form of a single or double ring; the double-ring hoop structure essentially comprises two concentric rings and further radial connection elements between said two rings.

The hoop structure is provided to one or both ends of plates. In vertical axis reactors, said hoop structure is fixed at least to top radial sides of the plates, and optionally also to opposite bottom sides of the plates themselves. Preferably, the hoop structure is fixed to fluid collectors or distributors integral with said radial sides of the heat exchange plates.

According to other equivalent embodiments, the heat exchange plates are arranged into one single row or, alternatively, into several rows or concentric "circles", with respective hoop structures for each row of plates, each hoop structure having possibly a single-ring or double-ring structure. Preferably, the inner plates are further connected to the plates of the next, outer row by hooks fixed to the respective hoop structures.

In a preferred embodiment, the heat exchange plates are arranged into modular elements called plate packs, each pack being made of a given number of plates, and being provided with a respective portion (or section) of the circumferential hoop structure, which is also modular. Furthermore, the modules or sectors of the hoop structure are provided with reversible connections, which allow to join the plate packs and restore the whole monolithic structure of the exchanger.

Such reversible connections, preferably, are represented by holes on the radial plates of the double-ring hoop structure, allowing to bolt the hoop sectors of the adjacent plate packs. Reversible connections can be obtained even through weldings performed in such a manner to be easily cut and re-welded during maintenance and replacement of the plates.

An object of the present invention is also an isothermal or pseudo-isothermal chemical reactor, comprising an internal plate heat exchanger and provided with a mechanical support system for said exchanger according to the invention.

The advantages of the invention are substantially the following.

The hoop structure restores the mechanical continuity between the plates, thus obtaining a monolithic structure of the heat exchanger in a single piece, though the heat exchanger is made up of plate packs which are pre-assembled and inserted one at a time into the shell of the reactor.

The exchanger can be pre-assembled when the reactor is a complete opening reactor, allowing insertion from above of the complete exchanger. In such case, the invention facilitates the manufacturing of an exchanger with a monolithic structure in a workshop, that is then lowered into the open reactor, reducing on-site works, costs and time of installation.

If the exchanger is inserted into the reactor while still disassembled (one plate pack at a time), the system according to the invention is efficient in restoring the mechanical unity of the plates; work is made easier, in particular, by the fixing to the top side collectors, generally more accessible.

Further advantages shall become evident from the following description, with reference to preferred but non-limiting embodiments.

DETAILED DESCRIPTION

Figure 1:
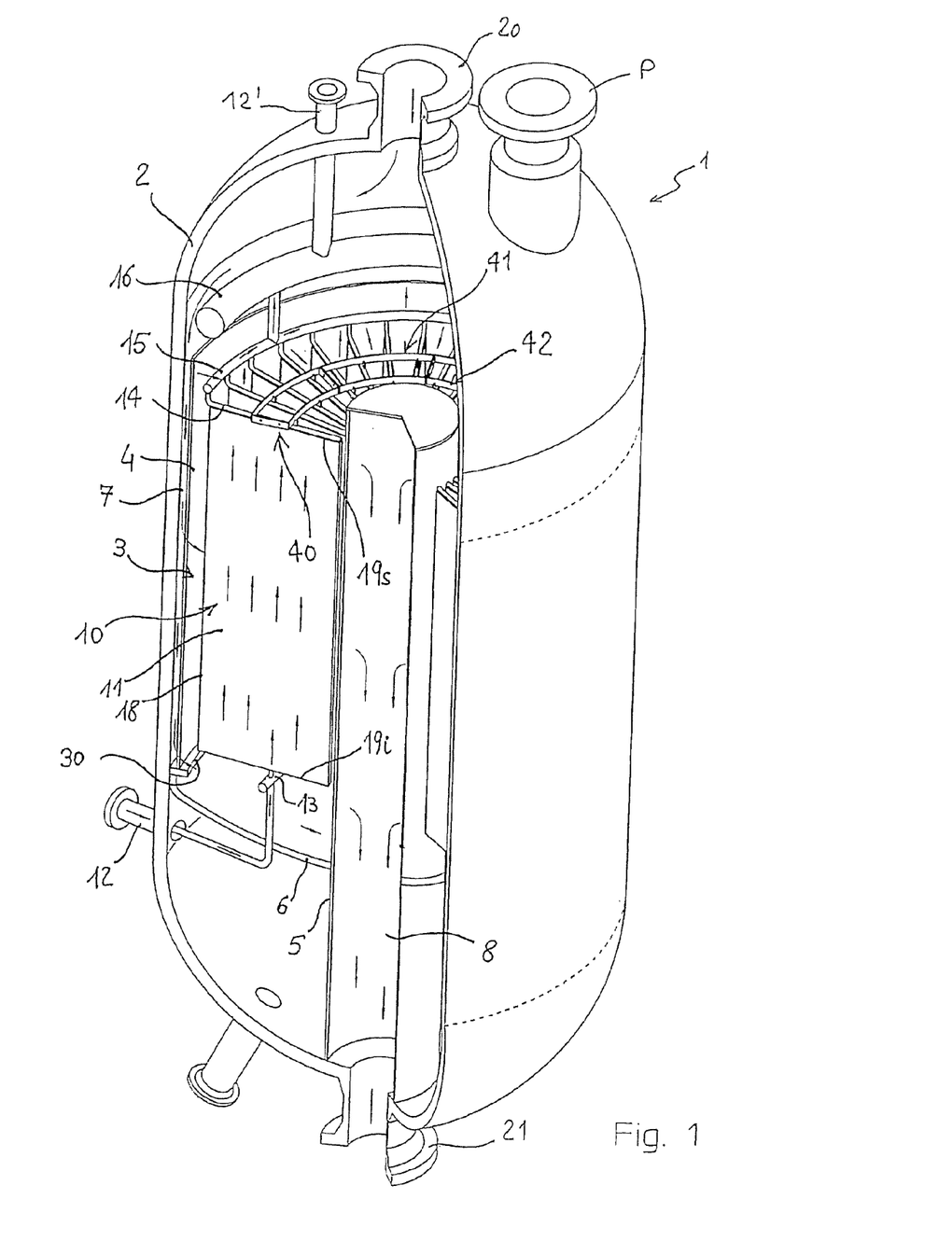
FIG. 1 schematically shows a cross-section of a radial flow isothermal reactor according to the invention, comprising a double-ring hoop structure of the plates.

With reference to FIG. 1, an isothermal reactor 1 is shown which in essential terms comprises a cylindrical shell 2, with a vertical axis, provided with flanges 20 and 21 for the inlet of reactants and outlet of reaction products, containing a plate heat exchanger 10. The shell 2 is further provided with a top opening or a manhole P.

The exchanger 10 is inserted into a catalytic basket 3, essentially made up of an external cylindrical wall 4, an internal cylindrical wall 5 and a bottom 6. The walls 4 and 5 are perforated to allow a radial flow of reactants/reaction products from a gap 7, between the wall 4 and the shell 2, through the basket 3 itself, and up to a central discharge pipe-collector 8 connected to the flange 21.

The catalytic basket 3 has a general substantially cylindrical and annular shape, and contains an amount of a suitable catalyser, not shown. The reaction zone, (or environment), inside the reactor 1, coincides with the space occupied by the catalyser in the basket 3 and is indicated by the dashed lines of FIG. 1.

The exchanger 10, inserted into the catalytic basket 3, comprises a plurality of heat exchange plates 11, each of which is substantially made up of a box-shaped, flattened body, with an internal chamber through which flows a heating or cooling fluid (heat exchange fluid). Such fluid can be in liquid or gaseous state or of any other state, such as water, molten salt, etc; it can also be represented by the same reactants pre-heated at the expense reaction heat.

The plates are arranged in a radial and vertical manner inside the reactor 1, with long sides 18 parallel to the axis of the reactor and respectively top and bottom short radial sides 19$s$ and 19$i$. The heat exchange fluid is supplied, in the example, through a flange or nozzle 12 and a distributor 13 connected to the sides 19$i$ of the plates; the same fluid is then collected by pipes 14 joined to the top short sides 19$s$; the pipes 14 join to a system of collectors 15, 16 connected to an outlet fluid nozzle 12'.

Figure 4:
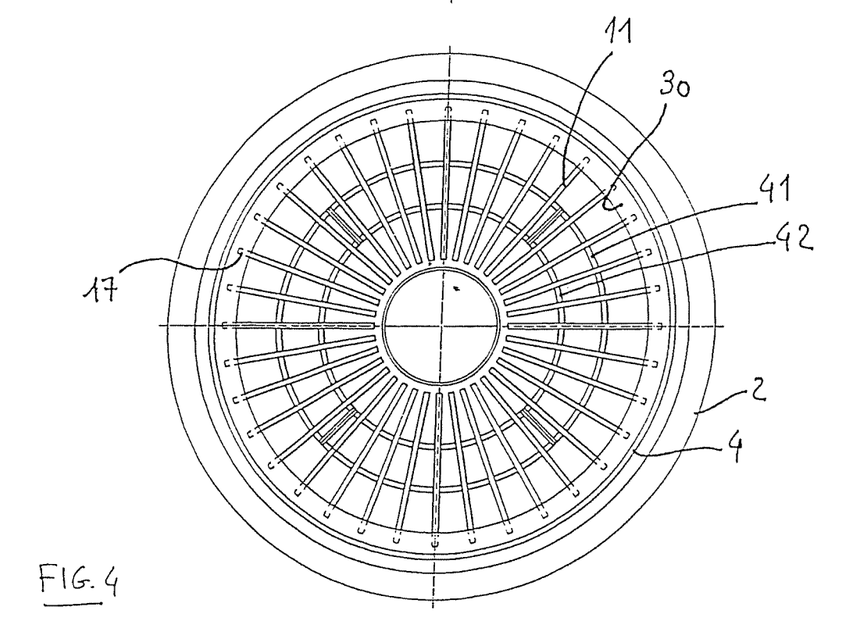

The plates 11 are supported by a lower and external circumferential support, in the example made using a bracket 30 having a rectangular section, fixed to the shell 2. Said bracket 30 provides a support for an edge zone 17 (FIG. 4) of short sides 19$i$ of the plates 11.

The heat exchange plates 11 are mechanically connected each other by a circumferential hoop structure 40, in the example structured as a double concentric ring, that is substantially comprising two rings 41, 42 fixed to top radial sides 19$s$ of the plates themselves.

More specifically, with reference to the non-limiting embodiment of FIGS. 1-4, the exchanger 10 is made of a plurality of modules or packs 10$a$ (FIG. 2) comprising a preset number of plates 11 and relative pipes 14; the structure 40 is also modular, comprising sectors 40$a$ fixed to the respective plate packs 10$a$.

Figure 2:
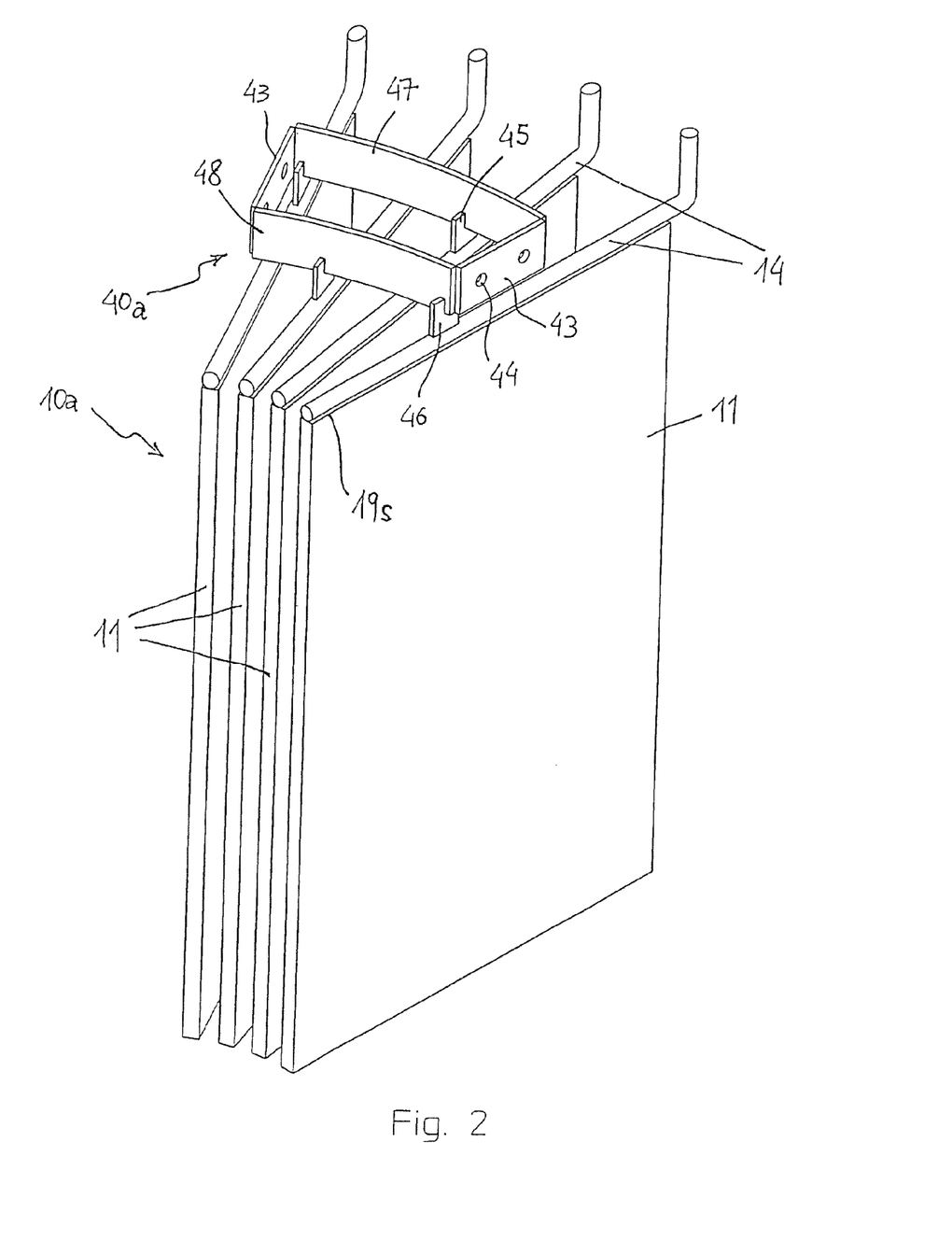
FIG. 2 shows a pack of plates of the reactor exchanger of FIG. 1.
Figure 3:
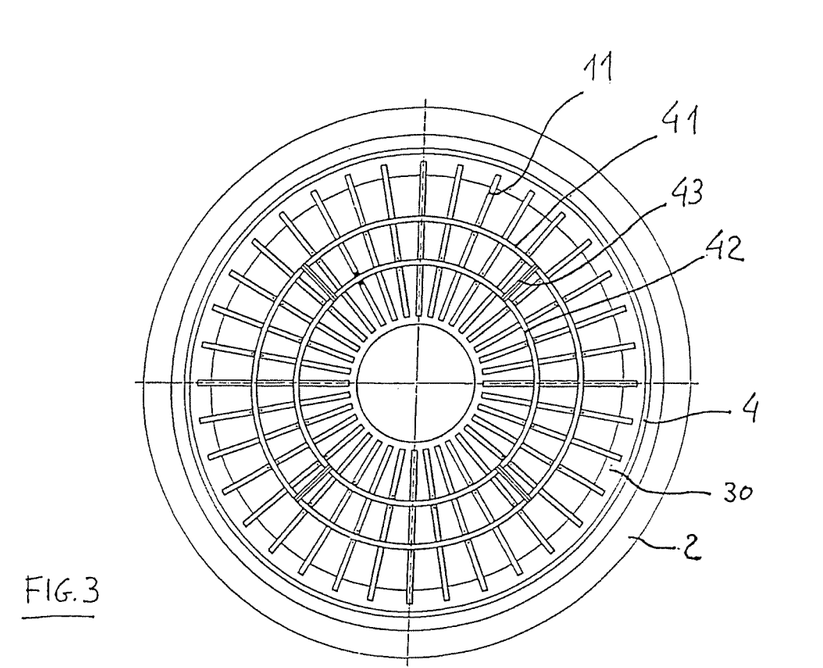
FIGS. 3 and 4 schematically show the exchanger inside the reactor of FIG. 1, respectively from a top and bottom view.

The sector 40$a$, associated to a single pack 10$a$, substantially comprises two circumferential and concentric plates 47, 48 made for example of steel of a suitable thickness, joined by radial plates 43 provided with fixing holes 44. The circumferential plates 47, 48 are fixed to supports 45, 46, in turn mechanically fixed (welded or by other means) to the sides 19$s$ of the plates 11, through pipes 14.

The supports 45, 46 are made with L-shaped square supports or "ears", to accommodate respectively the plates 47 and 48 and provide an abutment surface. Preferably, the square supports 45, 46 are offset as shown in FIG. 2, wherein an external square support 45 for the external plate 47 and an internal square support 46 for plate 48 are alternatively fixed onto adjacent pipes 14. It should be observed that fixing to the collectors 14, especially if performed by welding, is preferred given that the plates generally have a low thickness (to enhance heat exchange) and thus not suitable for direct welding; on the contrary, the collectors 14 have a higher thickness and are fixed in a stable manner to the plates, representing a safe point of anchorage.

Usually, the plates of a single pack 10a, of the type of FIG. 2, are joined by belt structural elements, arranged on the long sides, not shown.

The plate pack 10a, is mechanically fixed to identical adjacent packs, through the fixing of the respective plates 43, for example with bolts passing through the holes 44. Generally (FIGS. 3-4) the circumferential plates 47 and 48 of the various sections 40a form the double-ring structure 41, 42, which makes the plate 11 mechanically joined each other, thus obtaining a heat exchanger with a cylindrical-annular monolithic structure, the external lower edge, corresponding to the edges 17 of the sides 19i of the plates, resting on the bracket 30.

Figure 5:
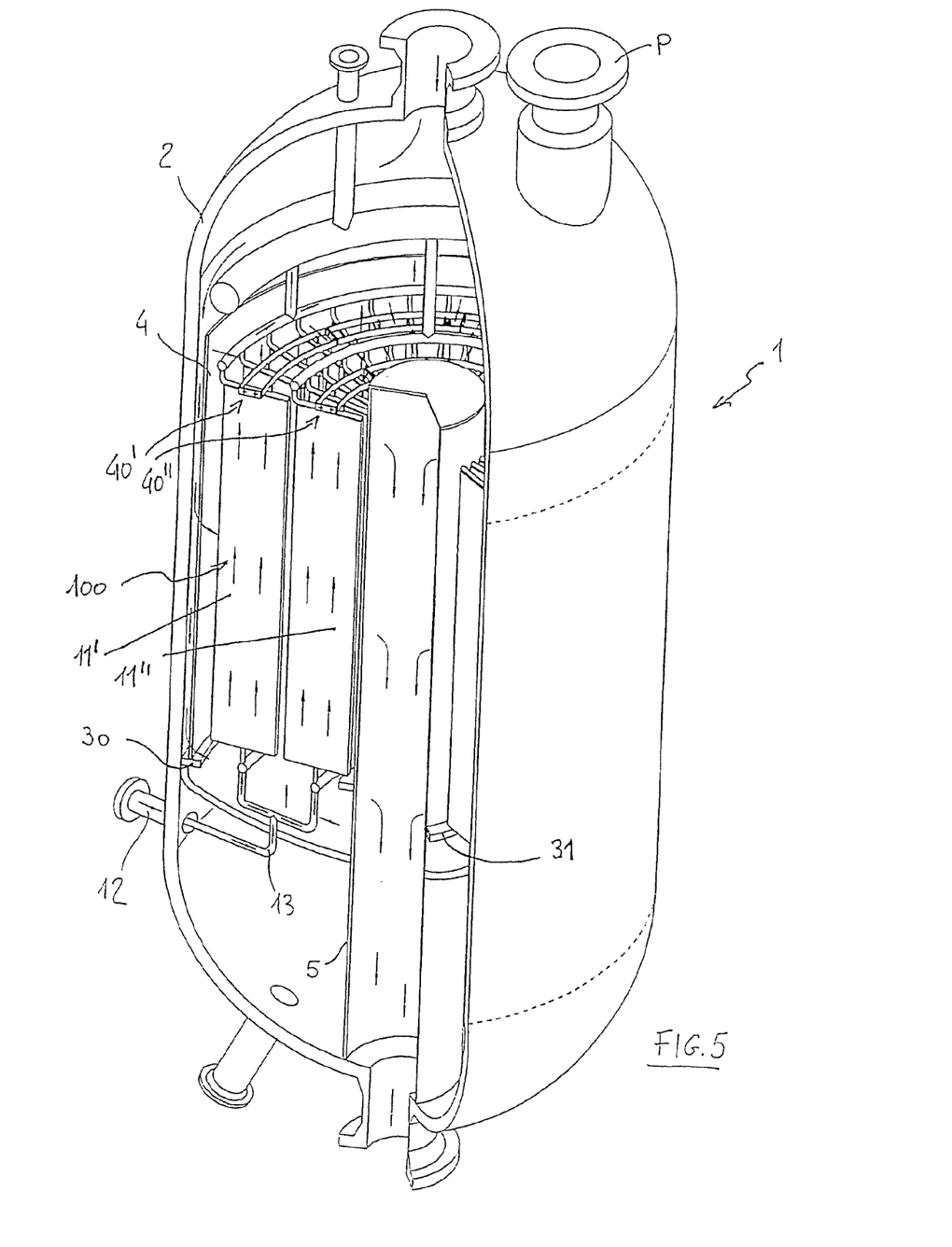
FIG. 5 shows another embodiment, wherein the exchanger has two concentric rows of the plates.

With reference to FIG. 5, another embodiment is shown where the reactor 1 is provided with a heat exchanger 100 comprising two concentric rows (or "circles") of plates 11' and 11" fed in parallel with the heat exchange fluid.

The rows of plates 11' and 11" comprise plate packs mechanically joined by respective hoop structures 40' and 40", as shown in FIG. 5. There is a first hoop structure 40' fixed to the plates 11' and a second concentric inner hoop structure 40", fixed to the plates 11". Furthermore, the plates 11" in the example, lie on a further optional bracket 31 fixed onto the internal wall 5.

Figure 6:
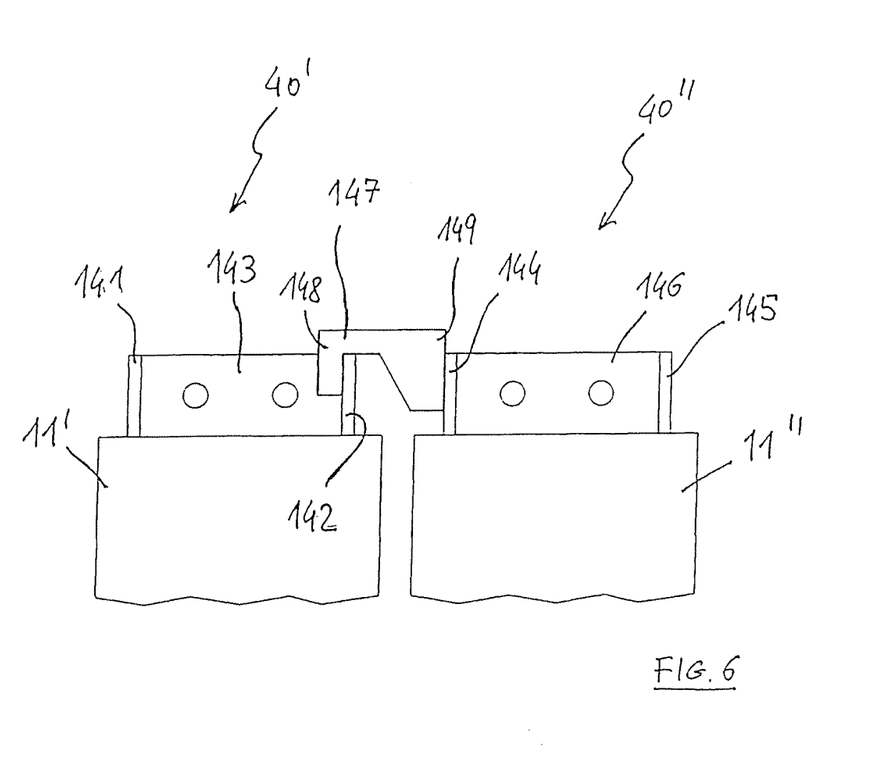
FIG. 6 represents an engagement system between the plates of an exchanger of the type provided with two concentric rows.

FIG. 6 shows in more detailed manner the hoop 40', made up of circumferential plates 141 and 142 and radial connection plates 143, and the concentric hoop 40" made up of circumferential plates 144 and 145 and radial plates 146. Advantageously, further connection elements are between the hoop rings 40' and 40" of the two rows of plates, represented in the example by hooks 147 through which the plates 11" of the inner row are supported (that is "hanged") onto the ring 40' of the outer plates 11'.

Further in details, the hook 147 has a portion 149 welded onto the plate 144 (outer circumferential plate of the ring of plates 11") and a hook-shaped portion 148 connecting to the plate 142 (inner plate of the ring of the plates 11'). The hooks 147 are arranged at suitable angular intervals.

Hooks 147 are generally advantageous in the absence of the bracket 31. In such case, as a matter of fact, the only support available is provided by the bracket 30, and the hooks 147 provide a stable support on said bracket 30 by restoring the monolithic structure of the two plate rows heat exchanger.

Circulation of the heat fluid in the plates 11' and 11" occurs in a parallel manner, the plates being provided with their respective collectors 13 and discharge pipes 14, these latter being joined to the same main collector 16. Piping of the heat fluid is made according to known technique and not essential for the implementation of the invention, and thus not further described.

Figure 7:
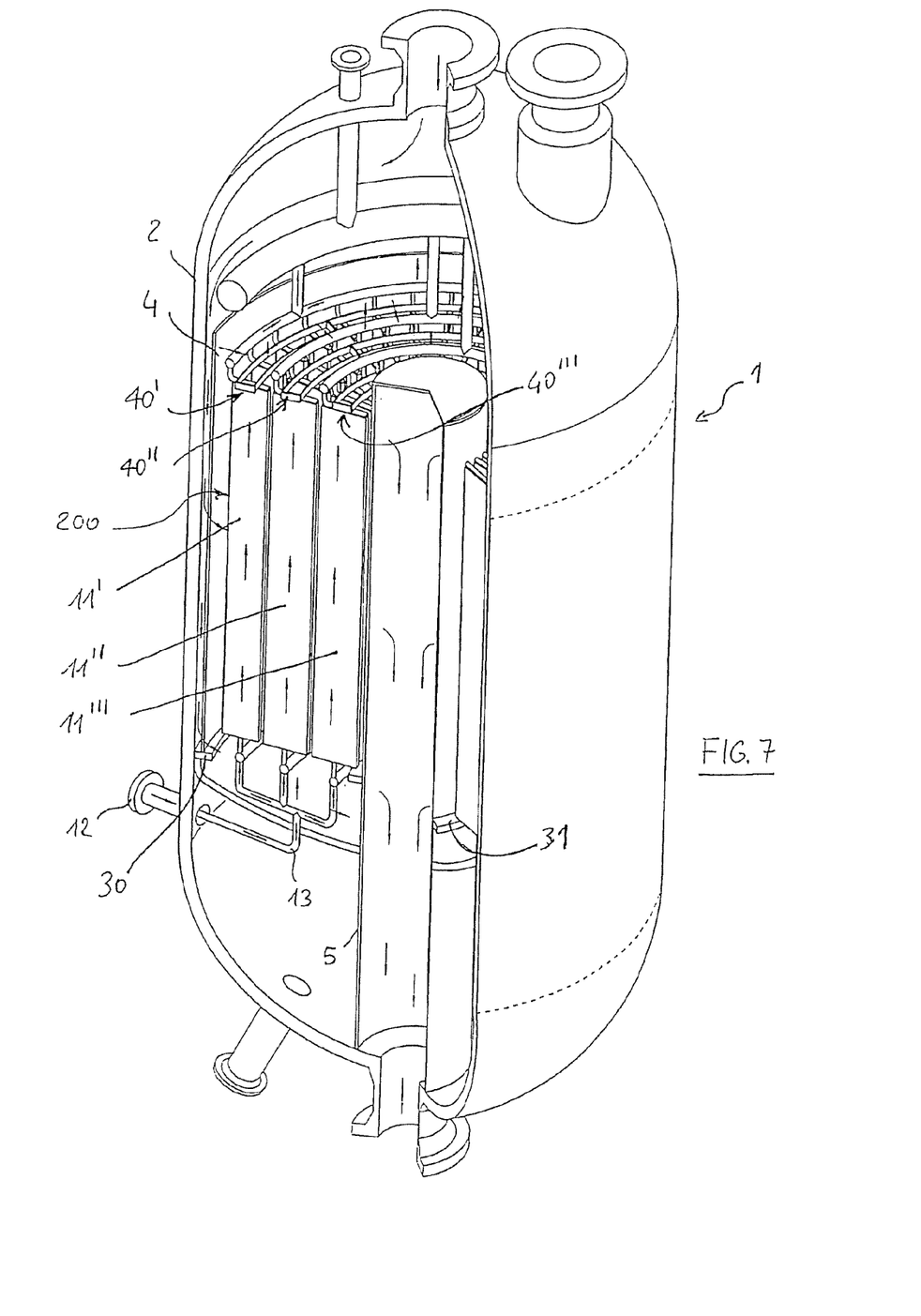
FIG. 7 shows another embodiment, wherein the exchanger is provided with three concentric rows of plates.
Figure 8:
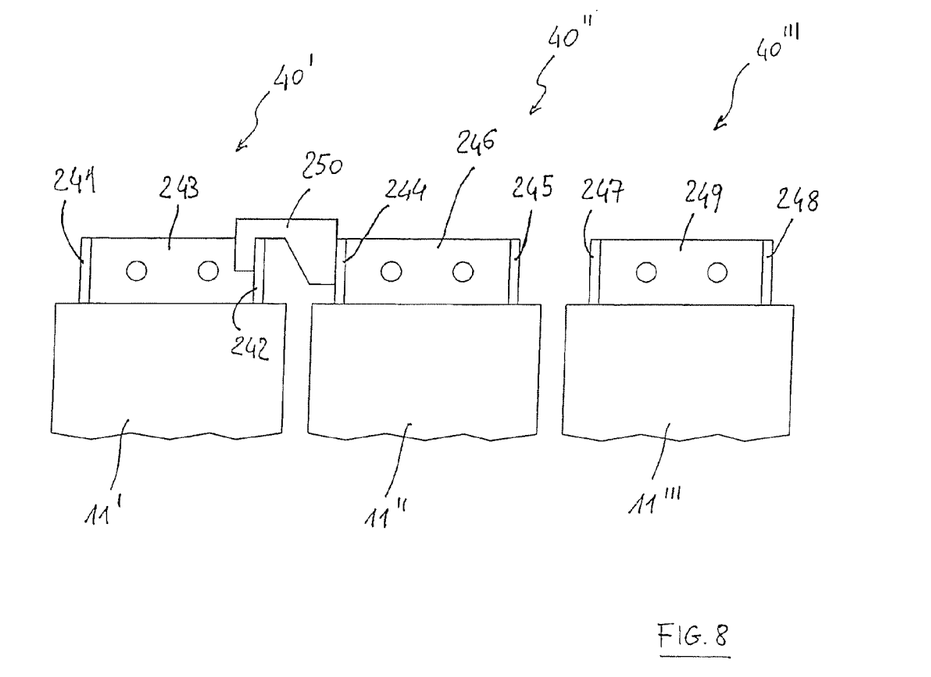
FIG. 8 shows a detail of FIG. 7.

In FIGS. 7-8 another embodiment is shown in which the reactor 1 comprises a heat exchanger 200 with three concentric rows or circles of plates 11' 11", 11''' fed in a parallel manner and with respective three double ring hoop structures 40', 40', 40'''. Each double-ring hoop comprises circumferential connection plates and radial plates; FIG. 8 illustrates circumferential plates 241, 242, 244, 245, 247, 248 and radial plates 243, 246, 249. Furthermore connection elements 250—substantially analogous to the hooks 147 previously described—are provided, by means of which the plates of the intermediate row 11" are supported on the plates of outer row 11'.

It should be observed (FIG. 7) that the plates 11' lie on the bracket 30 and the plates 11''' lie on the bracket 31, while under normal conditions there is no support for the intermediate plates 11", unless structural modification are imposed to the reactor, such modifications usually being labour-intensive and/or improper. In any case, hooks 250 allow obtaining a monolithic structure with the plates arranged on three rows.

Figure 9:
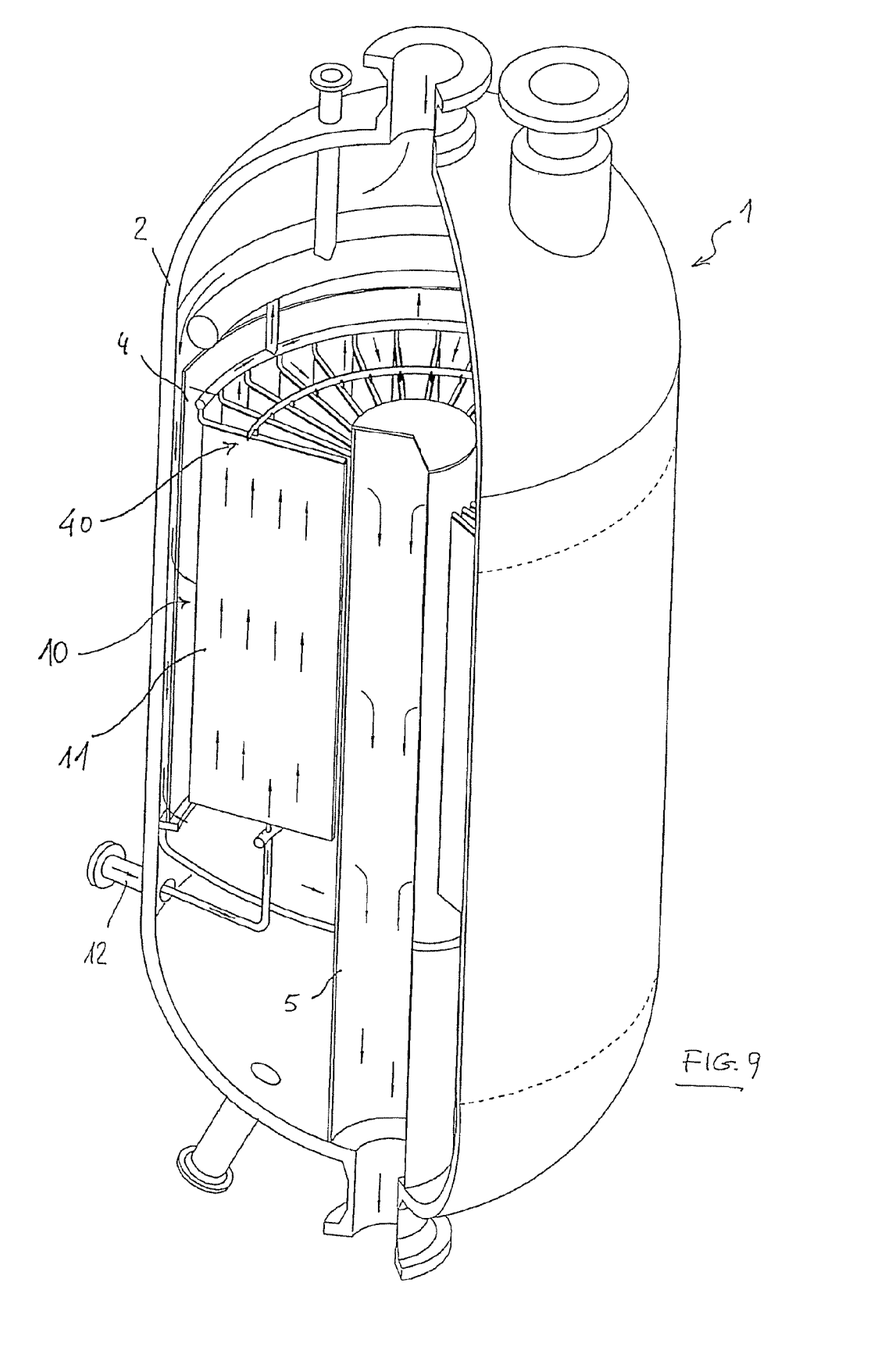
FIG. 9 shows a further simplified embodiment of the invention, wherein the hoop structure is of the single, welded ring type.

In a further embodiment, namely a simplified variant of FIG. 1, the structure 40 is made of a single ring, for example with only one circumferential plate (FIG. 9). Such single-ring embodiment is applicable on exchangers with one or more rows or circles of plates according to the above description. The single-ring hoop is advantageously divided into arc sections, joined by welding or joints of any other type (not illustrated), for example with the ends being overlapped and bolted.

Details regarding the reactor of FIGS. 5, 7 and 9, not explicitly indicated, shall be deemed equivalent to the ones of FIG. 1.

It should be observed that the described ring structures 40, with a single or double ring, can also be provided on the bottom sides 19i of the plates.

The invention attains the abovementioned objectives. The invention proves particularly advantageous for the insertion of a plate heat exchanger into a pre-existing reactor, for maintenance or also revamping operations. Generally, in these cases, only the bracket support 30 (FIG. 1) is provided and most of the reactors are made for partial opening, that is they are provided with a manhole P whose diameter is smaller than the diameter of the reactor, thus hindering the insertion of the complete exchanger 10.

Thus, plate packs 10a (FIG. 2) are inserted one at a time and they are arranged in the reactor, according to methods already known which are not described in details herein; however, it should be observed that the invention allows to restore the monolithic structure of the exchanger 10, upon completion of the insertion operations, providing a stable support on the bracket 30. Basically, a method for inserting a plate heat exchanger of the type taken into account comprises the steps of:

Arranging the plate packs 10a inside the reactor 1, each pack being provided with the hoop sector 40a;

Fixing the hoop sectors 40a each other, for example through bolting, restoring the structural continuity of the exchanger.

The abovementioned method applies analogously to exchangers with more than one row of plates, of the type of FIG. 5 of FIG. 7

Furthermore, the position of the hoop 40 on the upper side 19s is advantageous in that access for bolting (or welding) operations is relatively easy, while access to other zones of the plates (for example the long sides 18) is much more difficult, if not impossible, upon completion of assembly operations. The support on the bracket 30 is stable, given that the plates 11 are all integrally joined one to the other due to the hoop 40, and relative movements between the plates are hindered.

Furthermore, the invention is advantageous for manufacturing new reactors; if the reactor is of the complete opening type, it allows pre-assembling the exchanger and easily lowering it into the reactor itself.

Finally, it should be observed that the invention can be applied on various types of reactors, and precisely on radial, axial or combined flow reactors.

The invention claimed is:

1. An isothermal or pseudo-isothermal chemical reactor having a vertical axis, and comprising:
   a plate heat exchanger having a generally cylindrical-annular structure and comprising radial heat exchange plates having a substantially parallelepiped box-shaped body with longitudinal sides parallel to an axis of the reactor and having radial sides at their opposite ends; a piping for distributing and collecting a heat exchange medium to/from said plates; and a mechanical support system of said heat exchanger comprising a circumferential hoop structure fixed at least to the top radial sides of said plates.

2. The reactor according to claim 1, said circumferential hoop structure having a double-ring structure, comprising two concentric rings joined to the heat exchange plates, and radial connection elements between said two rings.

3. The reactor according to claim 1, said hoop structure being fixed to fluid collectors joined to said radial sides of the heat exchange plates.

4. The reactor according to claim 1, the circumferential hoop structure being provided at both ends of the plate, joined to the top (19s) and bottom radial sides of the plates themselves.

5. The reactor according to claim 1, the plates of the heat exchanger being arranged in a plurality of plate packs, each pack comprising a given number of plates, and said circumferential hoop structure being made in a modular manner and comprising a plurality of sectors for respective plate packs of the heat exchanger.

6. The reactor according to claim 5, the sectors of said circumferential hoop structure comprising reversible connections which allow to join the plate packs.

7. The reactor according to claim 5, each sector of the hoop structure being made up of two circumferential plates connected by further radial plates, said radial plates being provided with fixing holes for reversible connection of the sectors of the hoop structure.

8. The reactor according to claim 1, wherein the heat exchanger comprises a plurality of concentric rows of plates, each row of plates being provided with a respective circumferential hoop structure.

9. The reactor according to claim 8, wherein the plates of at least one inner row or circle of plates are supported by the next, outer row or circle of plates, by means of hooks fixed to circumferential plates of the respective hoop structures.

10. A method for inserting an annular plate heat exchanger with a plurality of radially arranged plates, inside a chemical reactor, the method comprising the steps of:

arranging plate packs inside the reactor, each pack comprising a given number of plates and being provided with a sector of a hoop structure fixed to radial sides of the plates; and affixing the hoop sectors to each other, thus forming a continuous circumferential hoop structure and restoring the structural continuity of the heat exchanger.

* * * * *